(12) United States Patent
Park et al.

(10) Patent No.: US 7,590,423 B2
(45) Date of Patent: Sep. 15, 2009

(54) APPARATUS AND METHOD FOR ALLOCATING CHANNEL IN A WIRELESS COMMUNICATION SYSTEM

(75) Inventors: Won-Hyoung Park, Seoul (KR); Sang-Boh Yun, Seongnam-si (KR); Sung-Hyun Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 580 days.

(21) Appl. No.: 10/935,212

(22) Filed: Sep. 7, 2004

(65) Prior Publication Data

US 2005/0085235 A1    Apr. 21, 2005

(30) Foreign Application Priority Data

Sep. 22, 2003    (KR)    ............ 10-2003-0065704

(51) Int. Cl.
*H04W 72/00* (2009.01)
(52) U.S. Cl. .............. 455/450; 455/451; 455/452.1; 455/452.2; 455/456.4; 455/464; 370/329; 370/330; 370/343; 370/344; 370/437
(58) Field of Classification Search ...... 455/450–456.6, 455/464, 512, 513, 509, 439; 370/329, 330, 370/343, 344, 437, 395.2–395.43
See application file for complete search history.

(56) References Cited

U.S. PATENT DOCUMENTS

| | | | | |
|---|---|---|---|---|
| 5,524,280 | A * | 6/1996 | Douthitt et al. | 455/62 |
| 5,809,059 | A * | 9/1998 | Souissi et al. | 375/133 |
| 6,591,108 | B1 * | 7/2003 | Herrig | 455/452.1 |
| 6,744,743 | B2 * | 6/2004 | Walton et al. | 370/318 |
| 6,751,187 | B2 * | 6/2004 | Walton et al. | 370/210 |
| 6,940,824 | B2 * | 9/2005 | Shibutani | 370/252 |
| 7,003,302 | B2 * | 2/2006 | Yoshida et al. | 455/450 |
| 7,020,110 | B2 * | 3/2006 | Walton et al. | 370/334 |
| 7,162,211 | B2 * | 1/2007 | Viswanath et al. | 455/101 |
| 2002/0110138 | A1 * | 8/2002 | Schramm | 370/430 |
| 2003/0058881 | A1 * | 3/2003 | Wu et al. | 370/444 |
| 2003/0235178 | A1 * | 12/2003 | Cai | 370/342 |
| 2004/0048630 | A1 * | 3/2004 | Shapira | 455/509 |
| 2004/0071110 | A1 * | 4/2004 | Guey et al. | 370/329 |
| 2004/0120347 | A1 * | 6/2004 | Lee et al. | 370/468 |
| 2004/0184398 | A1 * | 9/2004 | Walton et al. | 370/203 |
| 2004/0192322 | A1 * | 9/2004 | Dacosta et al. | 455/452.1 |
| 2007/0099647 | A1 * | 5/2007 | Lee et al. | 455/522 |

FOREIGN PATENT DOCUMENTS

JP    06-197079    7/1994

(Continued)

*Primary Examiner*—Edward Urban
*Assistant Examiner*—Fayyaz Alam
(74) *Attorney, Agent, or Firm*—The Farrell Law Firm, LLP

(57) ABSTRACT

A channel allocation method in a BS that communicates on at least two channels in a wireless communication system is provided. The BS receives information related to the data rates of the available channels from the MSs within its cell area, calculates the variance of the data rates for each channel, arranges the channels according to the variances, and allocates the channels in the arranged order to the MSs to satisfy the required data rates of the traffic for the MSs.

15 Claims, 3 Drawing Sheets

FOREIGN PATENT DOCUMENTS

| | | |
|---|---|---|
| JP | 08-023567 | 1/1996 |
| JP | 2002-171560 | 6/2002 |
| JP | 2003-009240 | 1/2003 |
| JP | 2004-208234 | 7/2004 |
| JP | 2004-529527 | 9/2004 |
| JP | 2004-537875 | 12/2004 |
| WO | WO 02/49306 | 6/2002 |
| WO | WO 02/058300 | 7/2002 |

* cited by examiner

APPARATUS AND METHOD FOR ALLOCATING CHANNEL IN A WIRELESS COMMUNICATION SYSTEM

PRIORITY

This application claims priority under 35 U.S.C. §119 to an application entitled "Apparatus and Method for Allocating Channel in a Wireless Communication System" filed in the Korean Intellectual Property Office on Sep. 22, 2003 and assigned Serial No. 2003-65704, the contents of which are incorporated herein by reference.

BACKGROUND OF THE INVENTION

1. Field of the Invention

The present invention relates generally to a channel allocating apparatus and method in a communication system, and in particular, to a channel allocating apparatus and method in a wireless communication system.

2. Description of the Related Art

One of the major wireless communication system is the mobile communication system. The mobile communication system is configured to mainly provide voice communication service to users irrespective of their locations. It has been developed to additionally provide data services as well as voice services. The development of the mobile communication technology is a driving force behind the commercialization of the wireless local area network (WLAN) systems, the wireless local loop (WLL) systems, etc.

The above systems provide wireless communication services. Because radio resources are extremely limited, the efficiency utilized in allocating the radio resources must be increased to increase the system throughput. In this context, alot of time and energy is being expended toward the channel allocation in the systems. Among them, CDMA (Code Division Multiple Access) 1xEV-DO (Evolution-Data Only) is a system that allocates channels one of the more efficient manners. In the CDMA 1xEV-DO system, mobile stations (MSs) measure the strengths of pilot channels received from a base station (BS) and feed back the pilot signal strengths to the BS. The BS then allocates a forward channel to an MS in the best condition at a particular point in time and transmits the data to the MS. That is, the BS selects the MS in the best channel status based on the pilot strengths received from the MSs. Then, the BS allocates all of the channel resources to the MSs, being with the MS having the best channel status, at the next transmission time and transmits data to the MSs.

One problem in the channel allocation of the CDMA 1xEV-DO system is fairness in resource allocation. If a particular MS continuously has the best channel status and the other MSs have bad channel status, the latter are continuously excluded from the channel allocation. Yet, if channels are allocated to the other MSs having bad channel status, system throughput is decreased.

The wireless communication systems recently deployed include the CDMA and the TDMA (Time Division Multiple Access) systems. The CDMA and TDMA systems have inherent limits to increasing the throughput. Thus, studies are under way on methods of increasing throughput, aside from the methods currently in use in those systems. One of the methods is the OFDMA (Orthogonal Frequency Division Multiple Access).

In the OFDMA, orthogonal frequencies are allocated to MSs, for radio communication. However, there is no criteria for the allocation of the orthogonal frequency resources that has been specified so far. The channel allocation schemes adopted for the existing systems cannot be simply applied. Moreover, the existing schemes have the shortcomings of decreased throughput or unfairness. Accordingly, there is a need for a channel allocation method viable for the OFDMA system. At the same time, a method of determining an optimum hopping pattern or increasing the system throughput must be explored for an OFDMA system using frequency hopping.

SUMMARY OF THE INVENTION

An object of the present invention is to substantially solve at least the above problems and/or disadvantages and to provide at least the advantages below. Accordingly, an object of the present invention is to provide a channel allocating apparatus and method for increasing throughput in a wireless communication system.

Another object of the present invention is to provide a channel allocating apparatus and method for providing fairness in a wireless communication system.

A further object of the present invention is to provide a channel allocating apparatus and method for increasing throughput and providing fairness in an OFDMA wireless communication system.

The above objects are achieved by providing a channel allocation method and apparatus.

According to one aspect of the present invention, in a channel allocation method in a BS that communicates on at least two channels in a wireless communication system, the BS receives information related to the data rates of the available channels from the MSs within its cell area, calculates the variance of the data rates for each channel, arranges the channels according to the variances, and allocates to the MSs the channels in the arranged order to satisfy the required data rates of traffic for the MSs.

If additional channels remain after the channel allocation to the MSs, the remaining channels are reallocated. Here, the remaining channels are allocated first to an MS having the least channel resources exceeding the required data rate of the MS, or to an MS having the lowest ratio between the channel resources exceeding a required data rate and the required data rate, or to an MS in the best channel condition.

If there is shortage of channel resources after the channel allocation, the channels allocated to an MS in the best channel condition can be reallocated to an MS having channels insufficient to satisfy the required data rate of the MS from among the MSs having more channels than the required data rates of the MSs.

The reallocation is repeated until a predetermined fairness index is satisfied.

The channels are allocated in a descending order of variance such that a channel having the largest variance is allocated first to an MS having the highest data rate on the channel, and if the required data rate of the MS is satisfied, the MS is excluded from scheduling.

According to another aspect of the present invention, in a channel allocation method in a BS that communicates on at least two channels in a wireless communication system, the BS receives information related to the data rates of the available channels from the MSs within its cell area, calculates the variance of the data rates for each MS, arranges the MSs according to the variances, and allocates the channels to the MSs in the arranged order to satisfy required data rates of the traffic for the MSs.

If additional channels remain after the channel allocation to the MSs, the additional channels are reallocated. Here, the remaining channels are allocated first to an MS having the least channel resources exceeding the required data rate of the MS, or to an MS having the lowest ratio between channel resources exceeding a required data rate and the required data rate, or to an MS in the best channel condition.

If there is shortage of channel resources after the channel allocation, channels allocated to an MS in the best channel condition can be reallocated to an MS having channels insufficient to satisfy the required data rate of the MS from among MSs having more channels than the required data rates of the MSs.

The reallocation is repeated until a predetermined fairness index is satisfied.

The channels are allocated in a descending order of the variances of the MSs such that channels are allocated in a descending order of data rate first to an MS having the largest variance until the required data rate of the MS is satisfied.

According to a further aspect of the present invention, in a channel allocation method in a BS that communicates on at least two channels in a wireless communication system, the BS receives information related to the data rates of the available channels from the MSs within its cell area, calculates the average of the data rates for each MS, arranges the MSs according to the averages, and allocates the channels in the arranged order to the MSs to satisfy required data rates of traffic for the MSs.

The channels are allocated to the MSs in an ascending order of the average.

According to still another aspect of the present invention, in a channel allocation method in a BS that communicates on at least two channels in a wireless communication system, the BS receives information related to the data rates of the available channels from the MSs within its cell area, calculates the average of the data rates for each channel, arranges the channels according to the averages, and allocates the channels in the arranged order to the MSs to satisfy required data rates of traffic for the MSs.

The channels are allocated to the MSs in a descending order of average.

According to yet another aspect of the present invention, in a scheduling apparatus for allocating channels in a BS that communicates on at least two channels in a wireless communication system, a plurality of radio transceivers communicates with the MSs and receive information related to the data rates of the available channels from the MSs on report channels, a controller outputs the data rate information received from the radio transceivers according to the MSs, and a scheduler calculates the variance of the data rates for each channel and allocates the channels in a descending order of the variance such that a channel having the largest variance is allocated first to an MS having the highest data rate on the channel.

If channels remain after the channel allocation to the MSs, the scheduler further allocates the remaining channels to the MSs.

If there is shortage of channel resources after the channel allocation, the scheduler reallocates the channels allocated to an MS in the best channel condition to an MS having channels insufficient to satisfy the required data rate of the MS from among the MSs having more channels than the required data rates of the MSs.

According to yet further aspect of the present invention, in a scheduling apparatus for allocating channels in a BS that communicates on at least two channels in a wireless communication system, a plurality of radio transceivers communicates with the MSs and receive information related to the data rates of the available channels from the MSs on report channels, a controller outputs the data rate information received from the radio transceivers according to the MSs, and a scheduler calculates the variance of the data rates for each MS, and allocates the channels in a descending order of the variances of the MSs such that channels are allocated in a descending order of data rate first to an MS having the largest variance.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
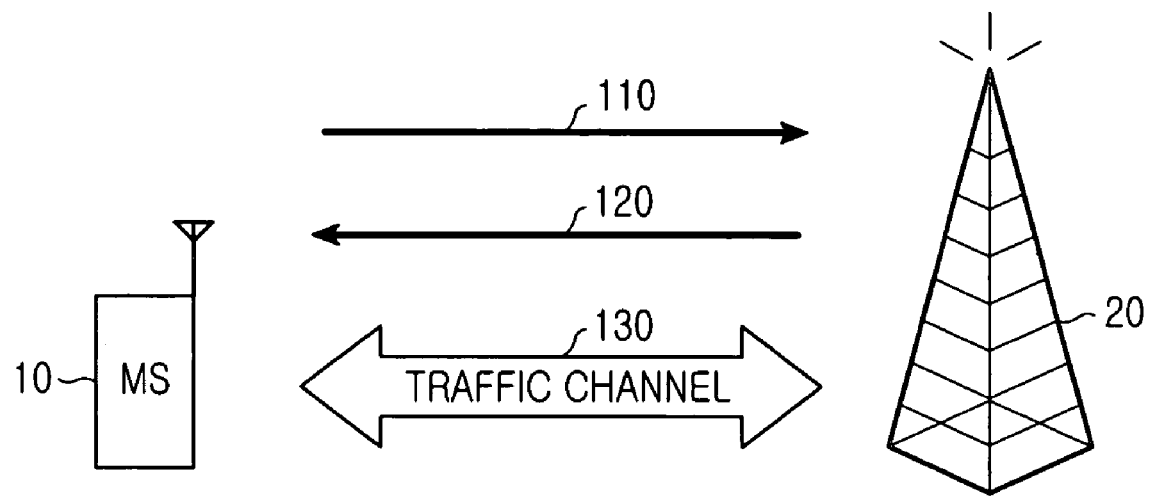
FIG. 1 illustrates a channel allocation in a wireless communication system to which the present invention is applied.

Referring to FIG. 1, the channel allocation between an MS and a BS in a wireless communication system according to the present invention will be described below.

An MS 10 reports its channel status to a BS 20 on a predetermined channel 110. The channel 110 will be referred to as a "report channel". The channel status information contains information indicating the status of each channel in an OFDMA system. Since the OFDMA system uses orthogonal frequencies, each frequency is a channel. Therefore, the MS 10 reports the status of a corresponding channel to the BS 20. For example, if 100 frequencies are available on the downlink directed from the BS 20 to the MS 10 in the OFDMA system, the MS 10 calculates an available data rate for each of the 100 frequencies and transmits to the BS 20 information indicating the available data rates on the report channel 110. The BS 20 receives such channel status information from all MSs from within its cell area. Using the channel status information, the BS can create a table as follows.

TABLE 1

|  | MS A | MS B | ... | MS M |
| --- | --- | --- | --- | --- |
| Channel 1 | $h_{A,1}$ | $h_{B,1}$ | ... | $h_{M,1}$ |
| Channel 2 | $h_{A,2}$ | $h_{B,2}$ | ... | $h_{M,2}$ |
| . | . | . | . | . |
| . | . | . | . | . |
| . | . | . | . | . |
| Channel 100 | $h_{A,100}$ | $h_{B,100}$ | ... | $h_{M,100}$ |

In Table 1, X in $h_{X,Y}$ identifies an MS and Y in $h_{X,Y}$ indicates a channel index. Thus, $h_{X,Y}$ indicates a data rate available on channel Y for MS X. The BS 20 allocates radio resources based on the information of Table 1. The radio resource allocation will be detailed later with reference to FIGS. 2 and 3. An efficient radio resource allocation method and a radio resource allocation method taking into consideration the fairness between MSs will be described in connection with FIGS. 2 and 3.

After allocating the radio resources using the information of Table 1, the BS transmits the channel allocation information to the MS 10 on a predetermined channel 120. At the same time, the uplink radio resources can be allocated. The uplink radio resources are allocated in the same manner and thus its description is not separately provided. The MS 10 and the BS 20 establish traffic channels 130 using the allocated resources and transmit/receive data on the traffic channels 130.

Figure 2:
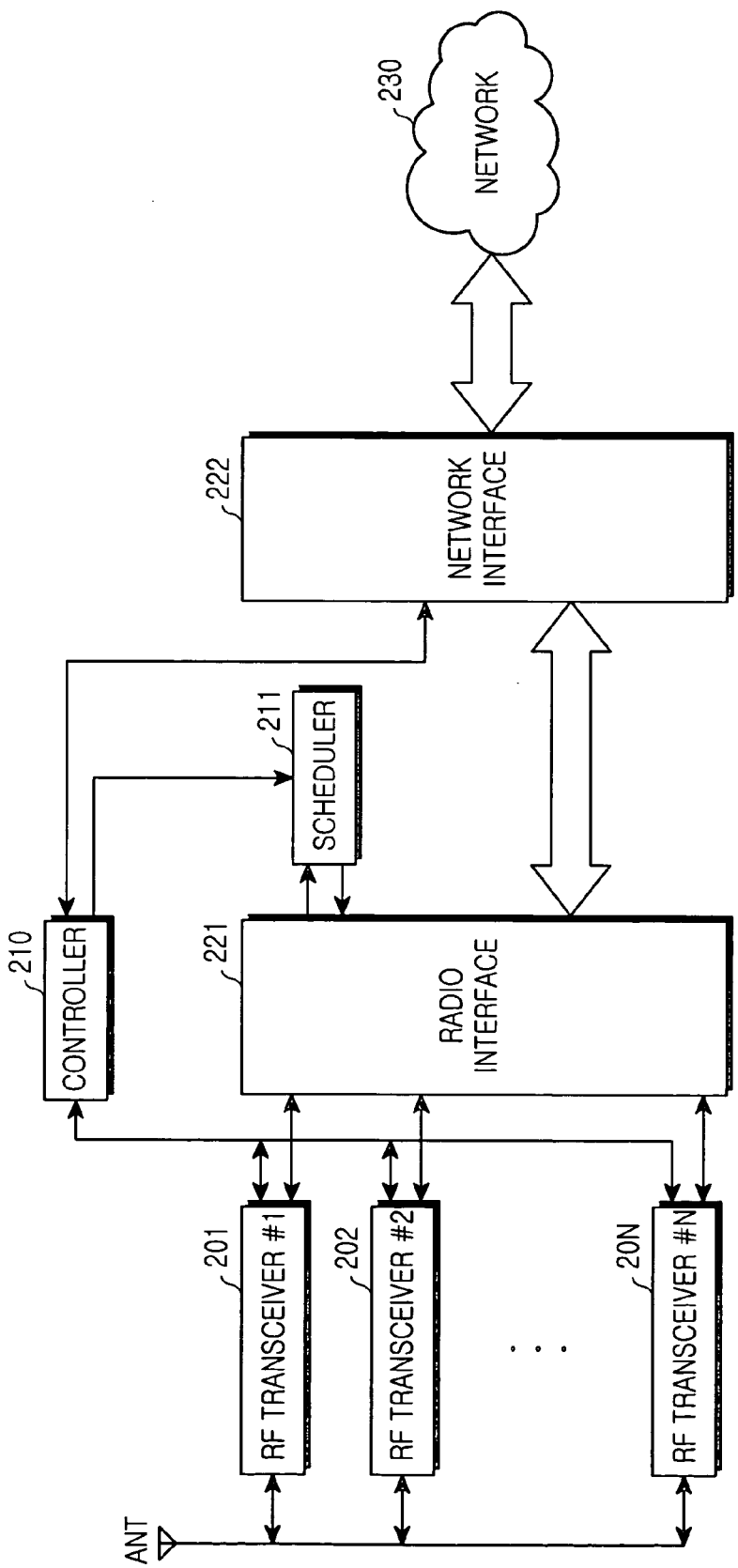
FIG. 2 is a block diagram of a BS designed to enable the channel allocation according to the present invention.

FIG. 2 is a block diagram of a BS for allocating the channels according to the present invention. The operation and structure of the BS related to the channel allocation according to the present invention will be described in detail.

Referring to FIG. 2, the radio transceivers 201 to 20N perform data communication on channels (i.e. frequencies) established between the BS and MSs through an antenna (ANT). The radio transceivers 201 to 20N provide channel information received from each MS to a controller 210. The radio transceivers 201 to 20N are connected to a radio interface 221. The radio interface 221 may include a buffer (not shown) for storing data to be transmitted to a particular MS. The radio interface 221 stores data received from a network interface 222 in the internal buffer and transmits the stored data to a corresponding radio transceiver under the control of a scheduler 211. The radio interface 220 also provides information indicating the state of the buffer to the scheduler 211. The radio interface 220 transmits data received from the radio transceivers 201 to 20N to the network interface 222. The radio interface 221 includes a switch (not shown) therein and transmits data through the radio transceivers 201 to 20N.

The network interface 222 is connected to a radio communication network 230, or other networks, for data communication. The network interface 222 transmits data received from the radio interface 221 or the controller 210 to a network 230 under the control of the controller 210. The network interface transmits data received from the network 230 to the controller 210 or to the radio interface 221 depending on whether the receive data is needed in the controller 210 or it is traffic for the radio interface 221.

The controller 210 provides the overall control to the BS, checks the status of all of the processing blocks, generates information related to the data repair and maintenance after the status check, and transmits the information to the network interface 222. The controller 210 provides channel information received from the radio transceivers 201 to 20N to the scheduler 211. When necessary, the controller 210 controls the operation of the scheduler. Alternatively, the scheduler 211 can be so configured to perform all of the operations required to implement the present invention. The component taking charge of the operations is determined according to the system configuration. The important thing is that channels are allocated in a later-described procedure according to the present invention.

The scheduler 211 receives from the controller 210 information related to the data rates of the channels reported by the MSs. The scheduler 211 determines the channels to be allocated to the MSs, taking into account the characteristics and the amount of the buffered traffic. This will be detailed later with reference to FIG. 3. The scheduler 211 controls the radio interface 221 to switch the buffered data to a predetermined radio transceiver and controls the establishment of a channel for the radio transceiver.

Figure 3:
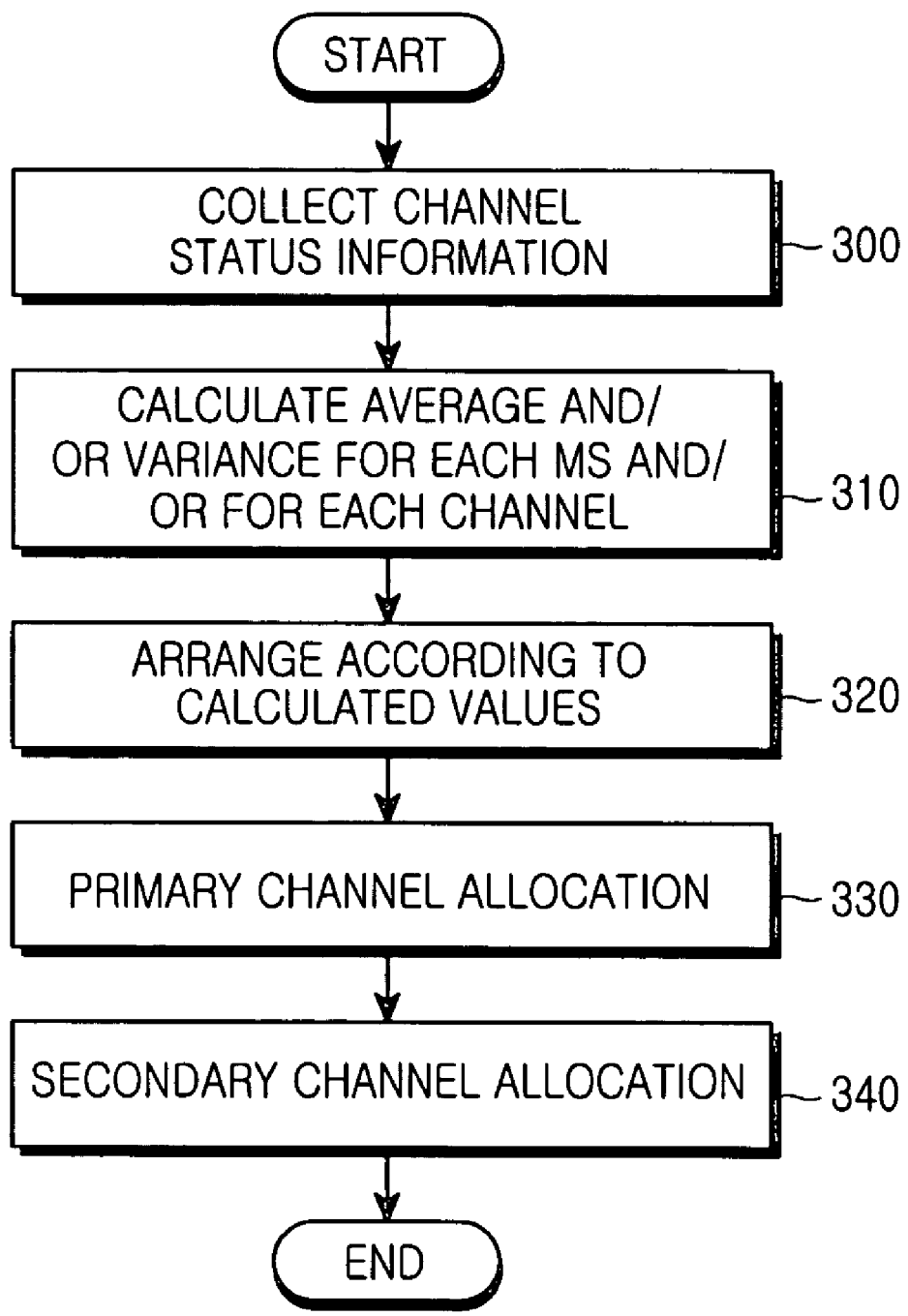
FIG. 3 is a flowchart illustrating a control operation for channel allocation in the BS according to a preferred embodiment of the present invention.

FIG. 3 is a flowchart illustrating a control operation for the channel allocation in the BS according to a preferred embodiment of the present invention.

Referring to FIG. 3, the BS 20 collects channel status information fed back from MSs within its cell area in step 300. The information collection is carried out by transmitting from the radio transceivers 201 to 20N to the controller 210 information received from the MSs on the report channels. The controller 210 tabulates the channel status information as shown in Table 1 and transmits the tabulated information to the scheduler 211.

The scheduler 211 calculates the average and/or variance of data rates for each MS and/or for each channel based on the channel status information in step 310. According to the present invention, the scheduler 211 can calculate the average or variance of the data rates for each MS, or the average or variance of the data rates for each channel, or the averages or variances of the data rates for each MS and for each channel, or the averages and variances of the data rates for each MS and for each channel. These cases will be individually considered by way of example.

Since the scheduler 211 calculates the average and/or variance of the data rates on an MS basis in the same manner as on a channel basis, only the latter will be described for the sake of conciseness.

Based on the channel state information illustrated in Table 1, Table 2 is constructed by adding the average of the data rates available on each channel.

TABLE 2

|  | MS A | MS B | ... | MS M | Average |
|---|---|---|---|---|---|
| Channel 1 | $h_{A,1}$ | $h_{B,1}$ | ... | $h_{M,1}$ | $M_1$ |
| Channel 2 | $h_{A,2}$ | $h_{B,2}$ | ... | $h_{M,2}$ | $M_2$ |
| . | . | . | ... | . | . |
| . | . | . | ... | . | . |
| Channel 100 | $h_{A,100}$ | $h_{B,100}$ | ... | $h_{M,100}$ | $M_{100}$ |

Under the column heading of Average, the average of the data rates available on each channel as reported by the MSs is listed. If the average of the data rates available on a channel is high, this implies that a high data rate is available on the channel for each MS. On the other hand, in the case where the average of data rates is calculated on an MS basis, if the average of the data rates for an MS is high over all of the channels, the MS is in good channel condition enough to receive all of the channels. That is, the scheduler 211 can calculate the average of data rates on a channel basis or on an MS basis.

In the case where the scheduler 211 calculates the variance of the data rates, Table 3 is constructed by adding the variance of the data rates available on each channel based on the channel state information illustrated in Table 1.

TABLE 3

|  | MS A | MS B | ... | MS M | Variance |
|---|---|---|---|---|---|
| Channel 1 | $h_{A,1}$ | $h_{B,1}$ | ... | $h_{M,1}$ | $V_1$ |
| Channel 2 | $h_{A,2}$ | $h_{B,2}$ | ... | $h_{M,2}$ | $V_2$ |
| . | . | . | ... | . | . |
| . | . | . | ... | . | . |
| Channel 100 | $h_{A,100}$ | $h_{B,100}$ | ... | $h_{M,100}$ | $V_{100}$ |

In Table 3, the variances indicate the distributions of the data rates available on the channels. If the variance of the data rates available on a channel is small, it means that the data rates on the channel reported by all of the MSs are about the same. On the contrary, if the variance is large, the data rates on the channel differ considerably in the MSs. Therefore, it is preferable to use both the average and the variance rather than use the average or variance alone.

After the scheduler 211 calculates the averages and/or variances of data rates on an MS basis or on a channel basis as described above in step 310, the scheduler 211 arranges the channels in a descending or ascending order according to the calculated averages and/or variances in step 320.

In step 330, the scheduler 211 primarily allocates the channels in one of four methods. The four methods are available in the case where the average or variance of data rates available on each channel is calculated on an MS basis. Since values not involved in each of the following methods are not needed, the average and/or variance calculation is correspondingly performed in step 310.

(1) An MS having the highest variance is given priority to a channel having the highest data rate available to the MS. In this manner, the channels are allocated to the MS until a required data rate for the buffered data in the radio interface 221 is satisfied. If an MS has a higher variance of the data rates available on the channels, a particular channel is considered in a condition good enough to offer a high data rate and other channels are in a condition bad enough to offer a low data rate. Thus, a higher-rate channel is allocated with the priority to the MS, thereby increasing the resource efficiency. After the channel allocation is completed for the MS having the largest variance according to its required data rate, channels are allocated to an MS having the second largest variance in the same manner, and so on until all of the channels are allocated.

(2) Channels are allocated first to an MS having the smallest average of the data rates available on the channels. If an MS has a small average, it implies that the MS is in a bad channel condition relative to an MS having a large average. Therefore, this channel allocation scheme is used for the purpose of protecting an MS in a bad channel condition with priority.

(3) Channels are allocated in a descending order of the variance. A channel having the largest variance is allocated first to an MS having the highest data rate on the channel. If the required data rate of the MS is satisfied, the MS is excluded from scheduling. In this manner, radio resources are allocated to the other MSs. When a channel has a high variance, it means that the MSs have very different data rates on the channel. Therefore, this channel allocation scheme is very efficient in its use of the radio resources. Since the data rates are approximate to each other on a channel having a small variance (the data rates may be high or low on the whole), it does not make any difference in terms of the radio resources use efficiency whether the channel is allocated to any of the MSs.

(4) Channels are allocated in a descending order of average. If a channel has a high average, it means that many high data rates are available on the channel. Therefore, the channel having the highest average is allocated first to an MS having the highest data on the channel, to thereby increase the resource use efficiency.

After the primary channel allocation in one of the above methods in step 330, the scheduler 211 performs secondary channel allocation in step 340. The secondary channel allocation is available when there remain channels after the required data rates of all MSs are satisfied, or when there exists an MS of which the required data rate is not satisfied after all of the channel resources are allocated.

In the former case, the secondary channel allocation is targeted at fairness. The following three schemes are applicable.

(a) Because all of the MSs secure their required resources, the remaining resources are allocated first to an MS having the least excess resources. Thus, a higher data rate than that which is required is available to the MS to ensure fairness.

(b) The remaining resources are allocated first to an MS having the lowest ratio between the excess resources and the required data rate. Thus, data can be transmitted more stably to an MS requested a higher data rate.

(c) With no regard to fairness, the remaining resources are allocated to the MSs in the worst channel condition for the respective channels. Thus, both channel efficiency and power use efficiency of a BS are increased.

In the latter case, it can be said that the BS has reserved too many resources. In practice, this problem cannot be solved by resource allocation. Yet, if the situation continues, an MS in a bad channel condition may be continuously excluded from resource allocation. Therefore, necessary resources can be allocated to the MSs which are continuously put behind at lower priority levels. When it is more important to satisfy the required data rates of some of the MSs than to satisfy the fairness among all of the MSs, the secondary channel allocation can be performed.

To reallocate the channel resources to the MSs to which the radio channels have not been allocated in the primary channel allocation, the following method can be used. There may exist MSs having more channel resources than required. These MSs are detected, channels are reallocated to them according to their required data rates, and the remaining channel resources are allocated to the higher-priority MSs having no radio resources allocated thereto. The secondary resource allocation is repeated until a predetermined fairness index is satisfied. Thus, resources are efficiently allocated, ensuring fairness. The fairness index is calculated by Equation (1).

$$\text{Measured Throughput: } (T_1, T_2, \ldots, T_n) \quad (1)$$
$$\text{Fair Throughput: } (O_1, O_2, \ldots, O_n)$$
$$\text{Normalized Throughput: } x_i = T_j / O_i$$
$$\text{Fairness Index} = \frac{\left\{\sum x_i\right\}^2}{n \sum x_i^2}$$

where "Measured Throughput" is a throughput measured for each MS, "Fair Throughput" is a throughput to be assigned to each MS using a predetermined method such as a max-min fairness, and "Normalized Throughput" is a ratio of Measured Throughput to Fair Throughput.

In the case of a lack of channel resources, whether or not to apply the above scheme of making the other MSs give up their channel resources acquired in a normal way for the MSs in the bad channel condition depends on the system policy.

Thus, channel resources may not be allocated to the MSs in the bad channel condition. In other words, the secondary channel allocation is optional in the present invention.

The above-described channel allocation of the present invention will be compared with a method of sequentially allocating channels to particular MSs or MSs prioritized according to their traffic characteristics alone. Specifically, the third primary channel allocation scheme in which the channels are allocated in a descending order of the variance is compared with the sequential channel allocation.

The present invention and the comparative example were simulated under the conditions that (1) there are enough resources to be allocated to all of the MSs and the remaining channels are allocated to an MS having the least resources exceeding its required data rate, after channel allocation to all MSs so that their required data rates are satisfied; (2) 256 channels with a bandwidth of 10 MHz and 8 MSs are used (Vehicular B channel model); (3) each MS request data rates for 32 channels; and (4) matlab simulation occurs 500 times. The simulation revealed the results illustrated in Table 4.

TABLE 4

|  | Present invention | Sequential allocation |
| --- | --- | --- |
| Average total throughput | 302.2000 | 286.1040 |
| Average efficiency | 0.5019 | 0.4758 |
| Average fairness index | 0.9862 | 0.9841 |
| Average simulation time | 0.0632 | 0.0634 |

As noted from the simulation results in Table 4, the present invention improves the average total throughput, the average efficiency, and the average fairness index. The improvement is confirmed by Table 5 and Table 6.

TABLE 5

| Order of rate satisfaction (MS index) | 1 | 7 | 8 | 5 | 2 | 6 | 4 | 3 |
| --- | --- | --- | --- | --- | --- | --- | --- | --- |
| Number of allocated channels | 8 | 49 | 57 | 67 | 130 | 137 | 147 | 149 |

TABLE 6

| Order of rate satisfaction (MS index) | 1 | 5 | 7 | 8 | 2 | 6 | 3 | 4 |
| --- | --- | --- | --- | --- | --- | --- | --- | --- |
| Number of allocated channels | 16 | 55 | 57 | 68 | 96 | 151 | 160 | 171 |

Table 5 lists the number of channels allocated to the MSs according to their required data rates in the present invention, whereas Table 6 lists the number of the channels allocated to the MSs according to their required data rates in the existing sequential channel allocation method. A comparison between Table 5 and Table 6 tells that the present invention allocates channels more efficiently.

As described above, the channel resource allocation according to the present invention offers the benefit of increased channel utilization while taking into consideration the system fairness.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel allocation method in a base station (BS) that communicates on at least two channels in a wireless communication system, comprising the steps of:
   receiving information related to data rates of available channels from mobile stations (MSs) within a cell area of a BS;
   calculating a variance of the data rates for each channel and arranging the channels according to the calculated variances of data rates for each channel;
   allocating the channels in a descending order of variances such that a channel having a largest variance is allocated first to an MS having a highest data rate on the channel; and
   if there is a shortage of channel resources after the channel allocation, reallocating channels allocated to an MS in a best channel condition to an MS having channels insufficient to satisfy a required data rate of the MS from among MSs having more channels than required data rates of the MSs;
   wherein the reallocation is repeated until a predetermined fairness index is satisfied, and the fairness index is calculated by:

Measured Throughput: $(T1, T2, \ldots, Tn)$

Fair Throughput: $(O1, O2, \ldots, On)$

Normalized Throughput: $xi = Tj/Oi$ $$\text{Fairness Index} = \frac{\left\{\sum x_i\right\}^2}{n \sum x_i^2}$$

wherein, the Measured Throughout is a throughput measured for each MS, the Fair Throughput is a throughput to be assigned to each MS, the Normalized Throughput is a ratio of Measured Throughput to Fair Throughput, the i is $1 \leq i \leq n$, and n denotes the number of MSs.

2. The method of claim 1, further comprising the step of reallocating remaining channels if channels remain after the channel allocation to the MSs.

3. The method of claim 2, wherein the remaining channels are reallocated first to an MS having the least channel resources exceeding a required data rate of the MS.

4. The method of claim 2, wherein the remaining channels are reallocated first to an MS having the lowest ratio between channel resources exceeding a required data rate and a required data rate.

5. The method of claim 1, wherein the allocation step comprises if the required data rate of the MS is satisfied, excluding the MS from further channel allocation.

6. A channel allocation method in a base station (BS) that communicates on at least two channels in a wireless communication system, comprising the steps of:
   receiving information related to data rates of available channels from mobile stations (MSs) within a cell area of a BS;
   calculating a variance of the data rates for each MS and arranging the MSs according to the variances;
   allocating the channels to the MSs in a descending order of variances such that an MS having a highest variance is given priority to a channel having the highest data rate available to the MS; and
   if there is a shortage of channel resources after the channel allocation, reallocating channels allocated to an MS in a best channel condition to an MS having channels insufficient to satisfy a required data rate of the MS from among MSs having more channels than required data rates of the MSs;
   wherein the reallocation is repeated until a predetermined fairness index is satisfied, and the fairness index is calculated by:

Measured Throughput: $(T1, T2, \ldots, Tn)$

Fair Throughput: $(O1, O2, \ldots, On)$

Normalized Throughput: $xi = Tj/Oi$ $$\text{Fairness Index} = \frac{\left\{\sum x_i\right\}^2}{n \sum x_i^2}$$

wherein, the Measured Throughput is a throughput measured for each MS, the Fair Throughput is a throughput to be assigned to each MS, the Normalized Throughput is a ratio of Measured Throughput to Fair Throughput, the i is $1 \leq i \leq n$, and n denotes the number of MSs.

7. The method of claim 6, further comprising the step of reallocating remaining channels if channels remain after the channel allocation to the MSs.

8. The method of claim 7, wherein the remaining channels are reallocated first to an MS having the least channel resources exceeding a required data rate of the MS.

9. The method of claim 7, the remaining channels are reallocated first to an MS having a lowest ratio between channel resources exceeding a required data rate and a required data rate.

10. The method of claim 6, wherein the allocation step comprises the step of allocating the channels in a descending order of the variances of the MSs such that the channels are allocated in a descending order of the data rates first to an MS having the largest variance and until the required data rate of the MS is satisfied.

11. A channel allocation method in a base station (BS) that communicates on at least two channels in a wireless communication system, comprising the steps of:
receiving information related to data rates of available channels from mobile stations (MSs) within a cell area of a BS;
calculating an average of the data rates for each MS and arranging the MSs according to the averages;
allocating the channels to the MSs in an ascending order of averages of the data rates such that an MS having a smallest average of the data rates available on the channels is allocated first; and
if there is a shortage of channel resources after the channel allocation, reallocating channels allocated to an MS in a best channel condition to an MS having channels insufficient to satisfy a required data rate of the MS from among MSs having more channels than required data rates of the MSs;
wherein the reallocation is repeated until a predetermined fairness index is satisfied, and the fairness index is calculated by:

$$\text{Measured Throughput: } (T1, T2, \ldots, Tn)$$
$$\text{Fair Throughput: } (O1, O2, \ldots, On)$$
$$\text{Normalized Throughput: } xi = Tj/Oi$$
$$\text{Fairness Index} = \frac{\{\sum x_i\}^2}{n \sum x_i^2}$$

wherein, the Measured Throughput is a throughput measured for each MS, the Fair Throughput is a throughput to be assigned to each MS, the Normalized Throughput is a ratio of Measured Throughput to Fair Throughput, the i is $1 \leq i \leq n$, and n denotes the number of MSs.

12. A scheduling apparatus for allocating channels in a base station (BS) that communicates on at least two channels in a wireless communication system, comprising:
a plurality of radio transceivers for communicating with MSs and receiving information related to data rates of available channels from the MSs on report channels;
a controller for outputting to a scheduler the data rate information received from the radio transceivers according to the MSs, wherein the BS comprises the controller;
the scheduler for calculating a variance of the data rates for each channel and allocating the channels in a descending order of the variance such that a channel having the largest variance is allocated first to an MS having a highest data rate on the channel;
if there is a shortage of channel resources after the channel allocation, reallocating channels allocated to an MS in a best channel condition to an MS having channels insufficient to satisfy a required data rate of the MS from among MSs having more channels than required data rates of the MSs;
wherein the reallocation is repeated until a predetermined fairness index is satisfied, and the fairness index is calculated by:

$$\text{Measured Throughput: } (T1, T2, \ldots, Tn)$$
$$\text{Fair Throughput: } (O1, O2, \ldots, On)$$
$$\text{Normalized Throughput: } xi = Tj/Oi$$
$$\text{Fairness Index} = \frac{\{\sum x_i\}^2}{n \sum x_i^2}$$

wherein, the Measured Throughput is a throughput measured for each MS, the Fair Throughput is a throughput to be assigned to each MS, the Normalized Throughput is a ratio of Measured Throughput to Fair Throughput, the i is $1 \leq i \leq n$, and n denotes the number of MSs.

13. The scheduling apparatus of claim 12, wherein if channels remain after the channel allocation to the MSs, the scheduler further allocates the remaining channels to the MSs.

14. The scheduling apparatus of claim 12, wherein if there is a shortage of channel resources after the channel allocation, the scheduler reallocates channels allocated to an MS in the best channel condition to an MS having channels insufficient to satisfy a required data rate of the MS from among MSs having more channels than the required data rates of the MSs.

15. A scheduling apparatus for allocating channels in a base station (BS) that communicates on at least two channels in a wireless communication system, comprising:
a plurality of radio transceivers for communicating with MSs and receiving information related to data rates of available channels from the MSs on report channels;
a controller for outputting to a scheduler the data rate information received from the radio transceivers according to the MSs, wherein the BS comprises the controller;
the scheduler for calculating a variance of the data rates for each MS and allocating the channels in a descending order of the variances of the MSs such that channels are allocated in a descending order of data rate first to an MS having a largest variance; and
if there is a shortage of channel resources after the channel allocation, reallocating channels allocated to an MS in a best channel condition to an MS having channels insufficient to satisfy a required data rate of the MS from among MSs having more channels than required data rates of the MSs;
wherein the reallocation is repeated until a predetermined fairness index is satisfied, and the fairness index is calculated by:

$$\text{Measured Throughput: } (T1, T2, \ldots, Tn)$$

-continued

Fair Throughput: $(O1, O2, \ldots, On)$

Normalized Throughput: $xi = Tj/Oi$ $$\text{Fairness Index} = \frac{\left\{\sum x_i\right\}^2}{n \sum x_i^2}$$

wherein, the Measured Throughput is a throughput measured for each MS, the Fair Throughput is a throughput to be assigned to each MS, the Normalized Throughout is a ratio of Measured Throughput to Fair Throughput, the i is $1 \leq i \leq n$, and n denotes the number of MSs.

* * * * *

UNITED STATES PATENT AND TRADEMARK OFFICE
CERTIFICATE OF CORRECTION

PATENT NO.      : 7,590,423 B2
APPLICATION NO. : 10/935212
DATED           : September 15, 2009
INVENTOR(S)     : Park et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 884 days.

Signed and Sealed this

Twenty-first Day of September, 2010

David J. Kappos
*Director of the United States Patent and Trademark Office*